United States Patent
Ling et al.

(10) Patent No.: US 11,085,321 B2
(45) Date of Patent: Aug. 10, 2021

(54) BLEED AIR COMPENSATED CONTINUOUS POWER ASSURANCE ANALYSIS SYSTEM AND METHOD

(71) Applicant: HONEYWELL INTERNATIONAL INC., Morris Plains, NJ (US)

(72) Inventors: Richard Ling, Scottsdale, AZ (US); Kevin Moeckly, Chandler, AZ (US); Alfred E. Carstens, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 520 days.

(21) Appl. No.: 15/883,713

(22) Filed: Jan. 30, 2018

(65) Prior Publication Data

US 2019/0234233 A1    Aug. 1, 2019

(51) Int. Cl.
*F02C 9/18* (2006.01)
*F01D 21/00* (2006.01)
*B64D 15/02* (2006.01)

(52) U.S. Cl.
CPC ............ *F01D 21/003* (2013.01); *B64D 15/02* (2013.01); *F05D 2220/323* (2013.01); *F05D 2260/80* (2013.01); *F05D 2270/303* (2013.01); *F05D 2270/3013* (2013.01); *F05D 2270/44* (2013.01)

(58) Field of Classification Search
CPC . B64C 27/04; B64D 15/02; B64F 5/60; F01D 21/003; F02C 6/08; F02C 7/047; F02C 9/00; F02C 9/18; F05D 2220/323; F05D 2260/80; F05D 2260/821; F05D 2270/3013; F05D 2270/303; F05D 2270/44
See application file for complete search history.

(56) References Cited

U.S. PATENT DOCUMENTS

| 3,538,760 | A  | 11/1970 | Atkey et al. |
| 4,991,389 | A  | 2/1991  | Schafer |
| 5,313,778 | A  | 5/1994  | Sweet et al. |
| 5,823,479 | A  | 10/1998 | Nield et al. |
| 6,260,004 | B1 | 7/2001  | Hays et al. |
| 6,823,675 | B2 | 11/2004 | Brunell et al. |
| 7,031,812 | B1 | 4/2006  | Pettigrew et al. |

(Continued)

FOREIGN PATENT DOCUMENTS

| EP | 1258618 A2 | 11/2002 |
| EP | 1926001 A2 | 5/2008 |

OTHER PUBLICATIONS

Evans, Alison B, The Effects of Compressor Seventh-Stage Bleed Air Extraction on Performance of the F1 00-PW-220 Afterburning Turbofan Engine, Feb. 1991, NASA (Year: 1991).*

(Continued)

*Primary Examiner* — Hunter B Lonsberry
*Assistant Examiner* — Matthew J. Reda
(74) *Attorney, Agent, or Firm* — Lorenz & Kopf, LLP

(57) ABSTRACT

A system and method for providing bleed air compensation for a continuous power assurance analysis of a gas turbine engine includes estimating bleed air flow rate from the gas turbine engine, estimating a shift in power turbine inlet temperature based on the estimated bleed air flow rate, and applying the estimated shift in power turbine inlet temperature to the continuous power assurance analysis of the gas turbine engine.

15 Claims, 5 Drawing Sheets

(56) References Cited

U.S. PATENT DOCUMENTS

| | | | |
|---|---|---|---|
| 7,328,098 | B1 | 2/2008 | VanderLeest et al. |
| 7,472,100 | B2 | 12/2008 | Volponi et al. |
| 8,036,844 | B2 | 10/2011 | Ling et al. |
| 8,068,997 | B2 | 11/2011 | Ling et al. |
| 8,259,208 | B2 | 9/2012 | Ciurea et al. |
| 9,352,849 | B2 | 5/2016 | McCollough et al. |
| 9,382,010 | B2 | 7/2016 | Chen et al. |
| 2002/0158517 | A1 | 10/2002 | Rouse et al. |
| 2003/0125906 | A1 | 7/2003 | Guaglardi |
| 2015/0107259 | A1* | 4/2015 | Eroglu .............. F02C 9/28 60/776 |
| 2016/0237915 | A1* | 8/2016 | Villanueva .............. F16K 31/42 |
| 2017/0218854 | A1* | 8/2017 | Nestico .............. F04D 29/542 |
| 2017/0322116 | A1* | 11/2017 | Escobedo Hernandez .............. B64F 5/60 |

OTHER PUBLICATIONS

Tucker, David, et al. "Characterization of Air Flow Management and Control in a Fuel Cell Turbine Hybrid Power System Using Hardware Simulation," American Society of Mechanical Engineers, paper No. PWR2005-50127, Apr. 2005, pp. 959-967.

Yu, Simon, et al. "Next Generation Power and Thermal Management System," SAE International, Paper No. 2008-01-2934, https://doi.org/10.4271/2008-01-2934, Nov. 2008.

Yuhas, Andrew, et al. "Effects of Bleed Air Extraction on Thrust Levels of the F404-GE-400 Turbofan Engine," NASA Technical Memorandum 104247, https://ntrs.nasa.gov/search.jsp?R=19920020182 2017-11-30T21:25:42+00:00Z, Jul. 1992.

Hindman, Rick, et al., "Design of a Missile Autopilot using Adaptive Nonlinear Dynamic Inversion," 2005 American Control Conference, Apr. 2005.

Singh, Balbahadur, "Online Aerodynamic Parameter Estimation for a Fault Tolerant Flight Control System," Thesis submitted to the College of Engineering and the faculty of the Graduate School of Wichita State University, Dec. 2005.

\* cited by examiner

BLEED AIR COMPENSATED CONTINUOUS POWER ASSURANCE ANALYSIS SYSTEM AND METHOD

STATEMENT REGARDING FEDERALLY SPONSORED RESEARCH OR DEVELOPMENT

This invention was made with Government support under This invention was made with Government support under W58RGZ-16-C-0046 awarded by the Army Contracting Command-Redstone. The Government has certain rights in the invention.

TECHNICAL FIELD

The present invention generally relates to continuous performance analysis, and more specifically to a system and method for providing bleed air compensation for a continuous power assurance analysis of a gas turbine engine.

BACKGROUND

Many systems are subject to some type of performance assessment upon system start-up and initialization to determine the capability of the system to perform various functions without exceeding a limit. For example, gas turbine engines used in aerospace applications, such as helicopters, are often subject to a daily pre-flight power assurance test before beginning a mission. The purpose of the daily power assurance test is to verify the helicopter engine(s) can meet the minimum power requirements needed for its mission without exceeding the power turbine inlet temperature limit.

Typically, the daily helicopter engine power assurance test is conducted while the helicopter is hovered at a relatively low altitude, and after steady-state engine conditions have been substantially achieved. As may be appreciated, in the context of military helicopter operations, this procedure can be potentially dangerous if it is conducted in a hostile military environment, such that the helicopter can be shot down by enemy fire. This procedure may also consume significant amounts of flight time and engine life, and may thus be relatively costly. Moreover, the daily power assurance test result is only provided at the beginning of the first flight of the day. Thus, if engine performance deteriorates during a mission the pilot may not be aware until the next day, when a new daily power assurance test is conducted.

Because of the above drawbacks, a system and method for conducting continuous power assurance during operations was developed. This system and method, which is disclosed in U.S. Pat. No. 8,068,997, provides real-time onboard evaluation of the health condition of a turbine engine in flight. Its main function is to allow the pilot to monitor the engine temperature margin and available power throughout the flight. If there is any sudden drop in temperature margin, then the pilot can quickly make changes in the planned mission based on the available power to ensure a safe remaining flight.

It has been determined, however, that variations in bleed air flow from the engine, if unaccounted for, can adversely impact the accuracy of continuous power assurance results. Unfortunately, most aircraft do not have flow sensors to monitor bleed air flow. Moreover, it is difficult to accurately estimate the amount of bleed air being extracted because of the numerous factors that have wide ranges of uncertainty.

Hence, there is a need for a system and method that reduces the impact of bleed air flow uncertainty on continuous power assurance accuracy when the exact amount of bleed air flow is uncertain.

BRIEF SUMMARY

In one embodiment, a method of providing bleed air compensation for a continuous power assurance analysis of a gas turbine engine includes the following implemented in a processor: estimating bleed air flow rate from the gas turbine engine, estimating a shift in power turbine inlet temperature based on the estimated bleed air flow rate, and applying the estimated shift in power turbine inlet temperature to the continuous power assurance analysis of the gas turbine engine.

In another embodiment, a bleed air compensated continuous power assurance analysis system for an aircraft gas turbine engine includes a flight conditions data source and a processor. The flight conditions data source configured to supply flight conditions data, where the flight conditions data are representative of aircraft flight conditions. The processor is coupled to receive the flight conditions data and is configured, upon receipt thereof, to: estimate bleed air flow rate from the gas turbine engine, estimate a shift in power turbine inlet temperature based on the estimated bleed air flow rate, and apply the estimated shift in power turbine inlet temperature to the continuous power assurance analysis of the gas turbine engine.

Furthermore, other desirable features and characteristics of the inventive system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although various embodiments are described herein in the context of a gas turbine engine, such as may be used for helicopter propulsion engine, the embodiments may be used with gas turbine engines in various other aircraft and various other vehicles, and may also be used in conjunction with various other machines and systems, not just gas turbine engines, and in various other end-use environments.

Figure 1:
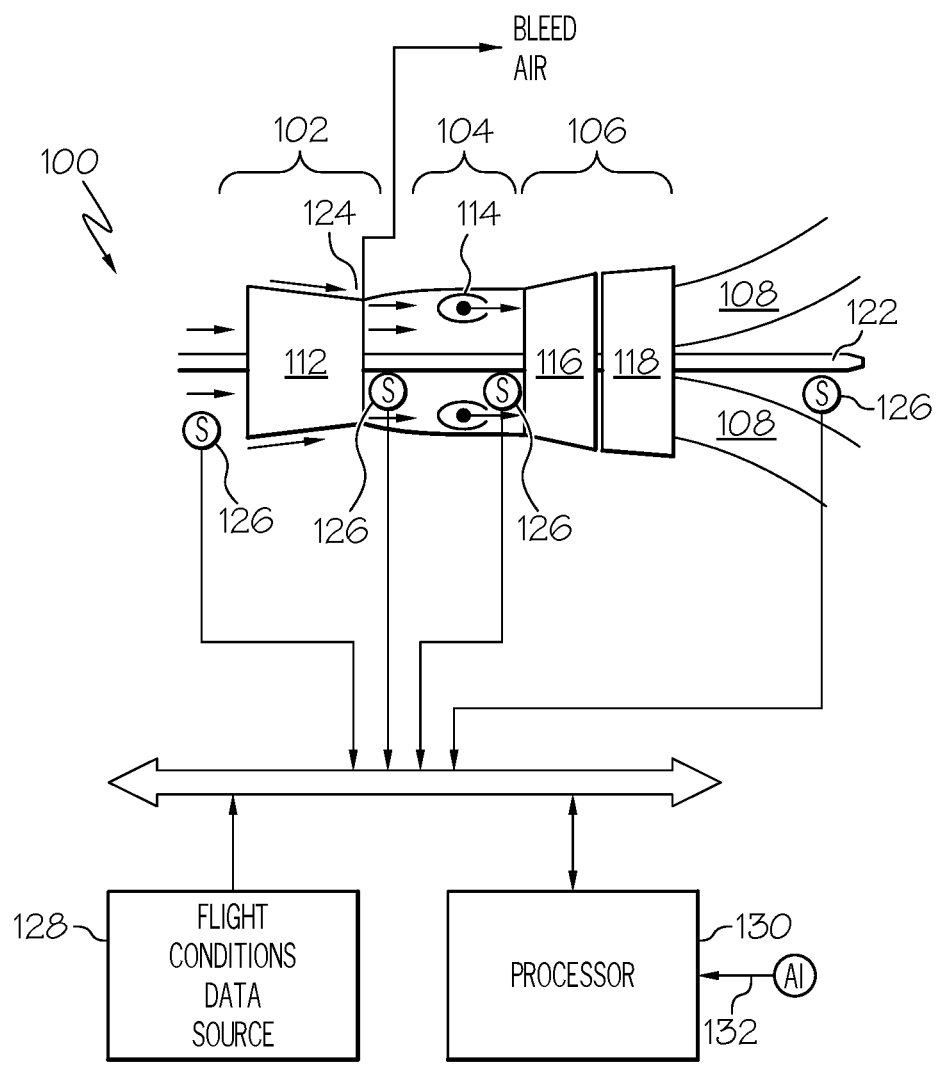
FIG. 1 is a functional block diagram of an exemplary gas turbine engine system.

Turning now to FIG. 1, a functional block diagram of an exemplary gas turbine engine 100 is depicted. The depicted engine 100 is a single-spool turbo-shaft gas turbine propulsion engine, and includes a compressor section 102, a combustion section 104, a turbine section 106, and an exhaust section 108. The compressor section 102 draws air into the intake section 102 and accelerates it. The compressor section 102, may include one or more compressors 112, draws air into the engine 100 and compresses the air to raise its pressure. In the depicted embodiment, only a single compressor 112 is shown, though it will be appreciated that one or more additional compressors could be used.

No matter the particular number of compressors 112 that are included in the compressor section 102, the compressed air is directed into the combustion section 106. In the combustion section 104, which includes a combustor assembly 114, the compressed air is mixed with fuel supplied from a non-illustrated fuel source. The fuel and air mixture is combusted, and the high energy combusted air mixture is then directed into the turbine section 106.

The turbine section 106 includes one or more turbines. In the depicted embodiment, the turbine section 106 includes two turbines, a high-pressure turbine 116 and a free power turbine 118. However, it will be appreciated that the engine 100 could be configured with more or less than this number of turbines. No matter the particular number, the combusted air mixture from the combustion section 104 expands through each turbine 116, 118, causing it to rotate a power shaft 122. The combusted air mixture is then exhausted via the exhaust section 112. The power shaft 122 may be used to drive various devices within the engine or vehicle. For example, in the context of a helicopter, the power shaft may be used to drive one or more rotors.

As is generally known, a portion of the compressed air that is discharged from the compressor(s) 112 may be directed into and through one or more bleed air outlet ports 124 (only one in the depicted embodiment). The compressed air that flows through the bleed air outlet port(s) 124 is generally referred to as bleed air, and is supplied to one or more pneumatic loads. The pneumatic loads may vary, and may be continuously supplied with bleed air and/or selectively supplied with bleed air. For example, in some embodiments, bleed air flow may be continuously supplied for use in cooling various equipment and/or components. In some embodiments, bleed air flow may be selectively supplied for providing aircraft anti-ice functions, and may also be selectively supplied for aircraft cabin heating and/or cooling and/or for various other selective functions. The bleed air flow that is continuously supplied is referred to herein as "passive bleed air flow," the bleed air flow that is selectively supplied for aircraft anti-ice functions is referred to herein as "aircraft anti-ice bleed air flow," and the bleed air flow that is selectively supplied for aircraft cabin heating and/or cooling and/or various other selective functions is referred to herein as "active bleed air flow." Stated more generally, however, active bleed air flow may be defined as bleed air flow that is supplied to bleed air loads that are not continuously supplied with bleed air and that are not anti-ice bleed air loads.

As FIG. 1 further depicts, a plurality of sensors 126 may be disposed in or near the engine 100. Each of the sensors 126 is configured to sense an engine parameter and supply performance data representative of the sensed parameter. It will be appreciated that the particular number, type, and location of each sensor 126 may vary. It will additionally be appreciated that the number and types of performance data supplied by the sensors 126 may vary depending, for example, on the particular engine type and/or configuration. In the depicted embodiment, however, at least a subset of the depicted sensors 126 supply performance data representative of, or that may be used to determine, engine inlet pressure, engine inlet temperature, shaft speed (both low-pressure and high-pressure, if applicable), fuel flow, compressor discharge pressure, power turbine inlet temperature, engine torque, shaft horsepower, and thrust, to name just a few.

A flight conditions data source 128 is also depicted in FIG. 1. The flight conditions data source 128 is configured to supply flight conditions data that are representative of various flight conditions. The various flight conditions may vary, but in the depicted embodiment include aircraft altitude, aircraft speed (e.g., Mach number), ambient temperature, and ambient pressure, to name just a few. Although the flight conditions data source 128 is, for ease of illustration, depicted as a single functional block, it will be appreciated that it may be implemented using various sensors, avionics systems, and/or any one of numerous aircraft systems.

No matter the specific number and types of performance data and flight conditions data, these data are supplied to a processor 130. The performance data and flight conditions data supplied to the processor 130 are used to conduct a bleed air compensated power assurance analysis of the engine 100. Because the power assurance analysis is conducted continuously and in real-time, it is referred to as a continuous power assurance (CPA) analysis. The processor 130, which may be implemented using one or more suitable general-purpose microprocessors, may be part of one or more systems or devices installed within an aircraft, such as an engine control unit (ECU), a prognostic health monitoring system (PHMS), or a health utilization and monitoring system (HUMS), just to name a few, or it may be a stand-alone device.

Figure 2:
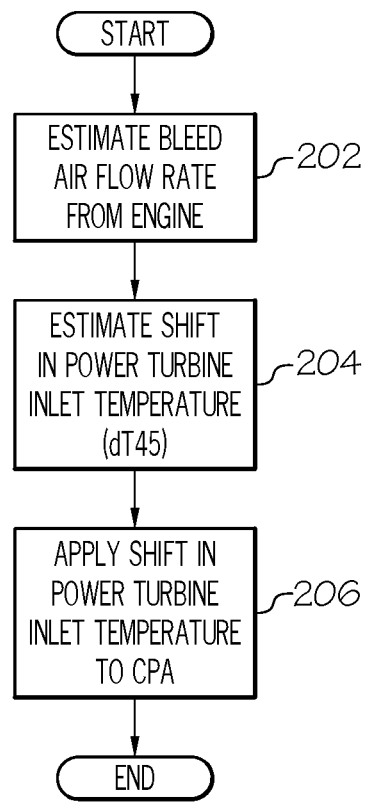
FIG. 2 depicts a general method, in flowchart form, that the system of FIG. 1 implements to compensate continuous power assurance analysis for bleed air flow.

Regardless of the specific location and implementation of the processor 130, it is, as just noted, configured to conduct a bleed air compensated continuous power assurance analysis of the engine 100 using the performance data and flight conditions data supplied from the sensors 126 and the flight conditions data source 128, respectively. The continuous power assurance analysis that the processor 130 conducts is accurate regardless of whether the collected performance data are steady state data or transient data. This is because the processor 126 is further configured to generate, using transient performance data, data that are representative of steady state performance data, which may then be used in subsequent portions of the continuous performance analysis. The processor 130 additionally accounts for, and thus compensates the continuous power assurance analysis for, bleed air flow from the engine 100. The general method that the processor 130 implements to compensate the continuous power assurance analysis for bleed air flow is depicted in flowchart form in FIG. 2, and with reference thereto will now be described.

The processor 130, which implements a hi-fidelity engine performance model, first estimates the bleed air flow rate from the gas turbine engine 100 (202). Then, based on the estimated bleed air flow rate, the processor 130 estimates the shift in power turbine inlet temperature (dT45) associated with the estimated bleed air flow rate (204). The processor 130 then applies the estimated shift in power turbine inlet temperature to the continuous power assurance analysis of the gas turbine engine 100 (206). As noted above, the estimated bleed air flow rate includes one or more of passive bleed air flow rate, anti-ice bleed air flow rate, and active bleed air flow rate. In particular, it includes at least the passive bleed air flow rate, and may additionally include one or both of the anti-ice bleed air flow rate and active bleed air flow rate. Each of these different bleed air flow constituents causes a shift in power turbine inlet temperature, which needs to be accounted for in the continuous power assurance analysis of the engine 100. The method that the processor 130 implements to estimate each of the bleed air flow rates, and to apply the associated shifts in power turbine inlet temperature (dT45), is depicted as a process flow diagram in FIG. 3, and will now be described.

Figure 3:
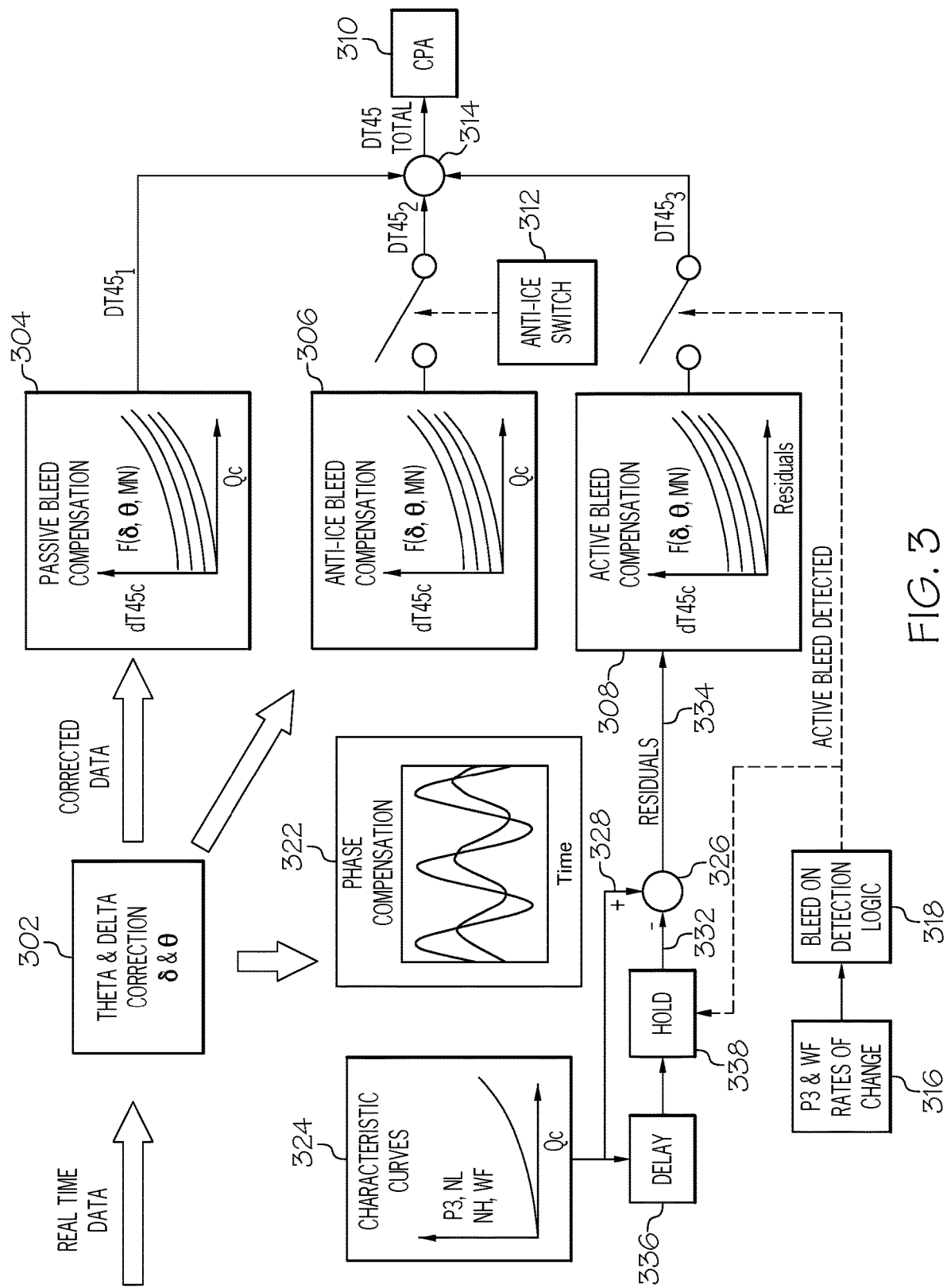
FIG. 3 depicts a process diagram of an exemplary method that may be implemented by the exemplary gas turbine engine system of FIG. 1 to conduct bleed air flow compensation for a continuous performance analysis.

As FIG. 3 depicts, the processor 130 receives at least a portion of the engine performance data and the flight conditions data that are collected during, for example, the flight of the aircraft in which the engine 100 is installed. In the depicted embodiment, the processor 130 corrects the performance data and, when needed, at least portions of the flight conditions data, for the ambient conditions 302 at the time the data were collected. This correction is accomplished by applying what are generally referred to as the theta correction (θ-correction) and the delta correction (δ-correction). As is generally known, the θ-correction is an ambient temperature correction factor, and the δ-correction is an ambient pressure correction factor. It will be appreciated that application of the ambient condition corrections is merely preferred, and need not be implemented if so desired.

The processor 130, as noted above, implements a hi-fidelity engine performance model. This model uses test data associated with the particular engine 100 and platform to estimate, based at least in part on flight conditions, the passive bleed air flow rate, the anti-ice bleed air flow rate, and the active bleed air flow. The model may then estimate the impact each of these bleed air flow estimates has on turbine inlet temperature. To do so, the model may, for example, use look-up tables of turbine inlet temperature shift (dT45) associated with passive bleed air flow 304, turbine inlet temperature shift (dT45) associated with anti-ice bleed air flow 306, and turbine inlet temperature shift (dT45) associated with active bleed air flow 308.

Before proceeding further, it is noted that the turbine inlet temperature shift associated with passive bleed air flow 304 may be referred to herein as the first shift in power turbine inlet temperature ($dT45_1$), the turbine inlet temperature shift associated with anti-ice bleed air flow 306 may be referred to herein as the second shift in power turbine inlet temperature ($dT45_2$), and the turbine inlet temperature shift associated with active bleed air flow 308 may be referred to herein as the third shift in power turbine inlet temperature ($dT45_3$).

In the depicted embodiment, the turbine inlet temperature shift ($dT45_1$) associated with passive bleed air flow 304 is continuously supplied to the continuous power assurance analysis function 310. It will be appreciated that this could be, in some embodiments, potentially conditional. For example, the engine 100 could, at times, be configured such that no bleed air whatsoever is being drawn from the engine 100. Regardless, however, the turbine inlet temperature shift ($dT45_2$) associated with anti-ice bleed air flow 306 is not continuously supplied to the continuous power assurance analysis function 310. Rather, it is supplied only when bleed air is indeed flowing to the various aircraft anti-ice loads. Because anti-ice bleed air flow is typically initiated by the flight crew via, for example, an anti-ice switch 312, the processor 130 is coupled to receive an anti-ice initiation signal 132 (see FIG. 1) from the anti-ice switch 312 and is configured, upon receipt of the anti-ice initiation signal, to detect that anti-ice bleed air flow is initiated. The processor 130 is also configured, as FIG. 3 depicts, to implement a summer function 314, which adds the second shift in power turbine inlet temperature 306 ($dT45_2$) to the first shift in power turbine inlet temperature 304 ($dT45_1$).

As may be appreciated, and as FIG. 3 further depicts, the turbine inlet temperature shift ($dT45_3$) associated with active bleed air flow 308 (i.e., the third shift in power turbine inlet temperature) also is not continuously supplied to the continuous power assurance analysis function 310. Rather, it is supplied only when active bleed air is activated. While active bleed air flow is typically initiated by the pilot, most aircraft do not include a sensor to indicate when active bleed air flow is initiated. Thus, the processor 130 is also configured to detect when active bleed air flow is initiated. Upon detecting that active bleed air flow is initiated, the third shift in power turbine inlet temperature 308 ($dT45_3$) is supplied to the adder function 314 and is added to at least the first shift in power turbine inlet temperature ($dT45_1$).

The technique implemented in the processor 130 to detect when active bleed air flow is initiated may vary. In the depicted embodiment, however, the processor 130 detects its activation based on a sudden drop in compressor discharge pressure (P3) that is faster than the rate of change of engine fuel flow can justify. Thus, as may be appreciated, and as was previously noted, the plurality of sensors 126 includes a compressor discharge pressure sensor and a fuel flow rate sensor. The compressor discharge pressure sensor is configured to sense compressor discharge pressure and supply a compressor discharge signal representative thereof, and the fuel flow rate sensor is configured sense fuel flow rate to the gas turbine engine 100 and supply a fuel flow rate signal representative thereof 316. The processor 130 is coupled to receive the compressor discharge signal and the fuel flow rate signal, and is configured, upon receipt of these signals, to implement active bleed air on detection logic 318. This logic 318 determines the compressor discharge pressure rate-of-change magnitude and the fuel flow rate rate-of-change magnitude, and detects that active bleed air flow is initiated when the compressor discharge pressure rate-of-change magnitude exceeds the fuel flow rate rate-of-change magnitude by a predetermined value. It will be appreciated that the predetermined value may vary from engine type to engine type, and is selected to provide accurate detection of active bleed air flow initiation.

The estimation of the active bleed air flow rate from the gas turbine engine, and thus its associated turbine inlet temperature shift ($dT45_3$), is based upon shifts in various engine parameters that occur after active bleed air flow is initiated. In particular, the pattern and amount of these shifts may be used to estimate active bleed air flow rate and thereby quantify the third shift in turbine inlet temperature shift ($dT45_3$). The estimation of active bleed air flow rate may be implemented in the processor 130 as either a table lookup or an equation as function of the various engine parameter shifts. The table lookup or equation that is implemented in the processor 130 is preferably based on a steady state engine performance model. Therefore, the engine parameters are first converted, in real-time, from transient values into steady state values as a function of engine torque (Q) 322.

Figure 4:
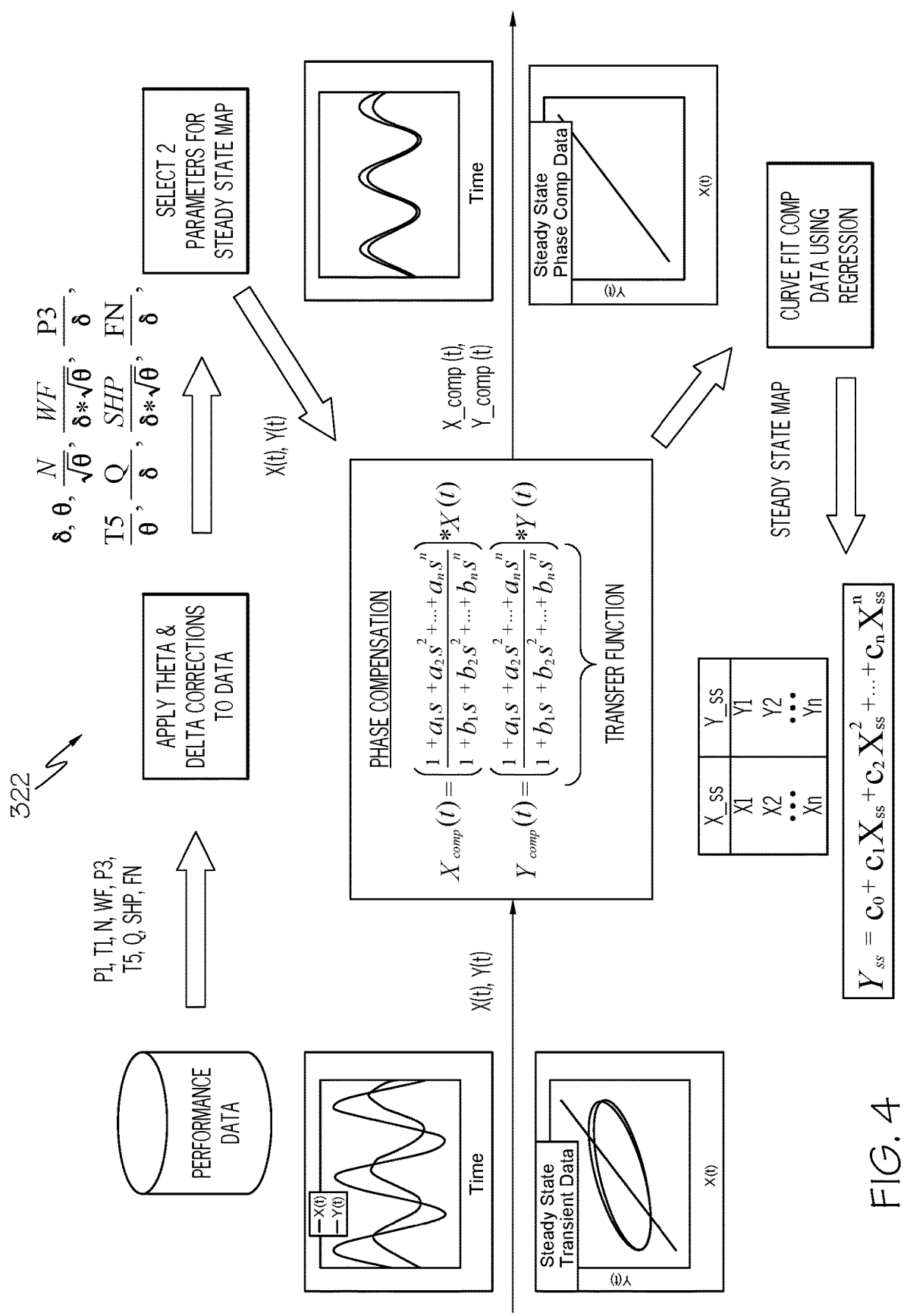
FIG. 4 depicts a process diagram of an exemplary method that may be implemented as part of the methods depicted in FIGS. 2 and 3 to generate phase compensated performance data.

Before proceeding further, it is noted that the conversion process 322 that is used to convert transient values into steady state values is depicted in FIG. 4 of the instant application, and is described in U.S. Pat. No. 8,036,844 (the '844 patent), which issued on Oct. 11, 2011, and is entitled, "Transient Performance Data Phase Compensation System and Method." That patent, which is assigned to the Assignee of the present application, and shares a common inventor, is hereby incorporated by reference. As described in the '844 patent, this conversion process 322 includes collecting transient engine performance data for the gas turbine engine using the plurality of sensors 126 and supplying the transient engine performance data to the processor 130. The transient engine performance data may include one or more engine performance parameters that vary upon initiation of active bleed air flow.

In the processor 130, transfer functions are applied to the transient performance data to thereby generate phase compensated engine performance parameters, where the phase compensated engine performance parameters are estimates of steady state values of various ones of the engine performance parameters as a function of another one of the engine performance parameters 324. The engine performance parameters that are used may vary in number and in type. In the depicted embodiment, some example engine performance parameters that are converted from transient values into steady state values as a function of engine torque include one or more of compressor discharge pressure (P3), low-pressure shaft speed (NL), high-pressure shaft speed (NH), and fuel flow rate (WF), and engine torque (Q) to name just a few.

Regardless of the number and type of engine performance parameters that are used, the processor 130, upon detection of active bleed air flow initiation, implements a subtraction function 326 to compute the difference between the current estimate of the steady state value 328 and a previous estimate of the steady state value 332 to thereby generate a residual value 334. The processor 130 then estimates the active bleed air flow rate from the gas turbine engine, and thus the third shift in power turbine inlet temperature 308, based at least in part on the residual value 334.

It is noted that the previous estimate of the steady state value 332 is a value that was computed prior to the processor 130 detecting active bleed air flow initiation. The previous estimate is supplied via a delay function 336 and a hold function 338. As FIG. 3 depicts, the previous estimate of the steady state value 332 is supplied to the subtraction function 326 only after active bleed air flow initiation is detected.

Figure 5:
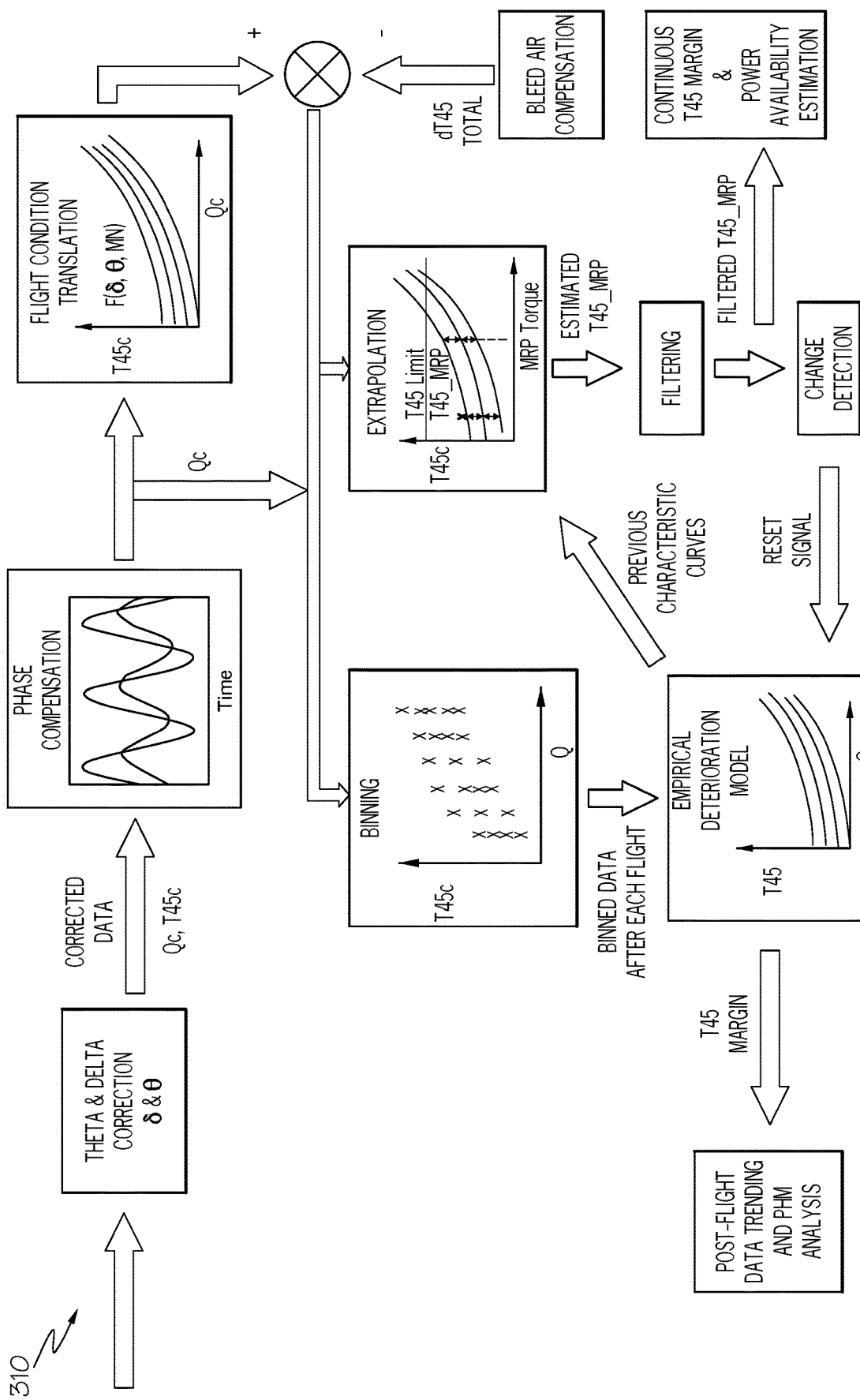
FIG. 5 depicts a process diagram of an exemplary continuous performance analysis method that may be implemented by the exemplary gas turbine engine system of FIG. 1.

The total shift in turbine inlet temperature (dT45) associated with bleed air flow, which is output from the adder function 314, is applied to the continuous power assurance analysis 310 of the engine 100 and is used to adjust the T45 values generated by the continuous power assurance analysis 310. The continuous power assurance analysis 310, a process diagram of which is depicted in FIG. 5, is implemented in the processor 130 and provides continuous power assurance monitoring for the engine 100. The depicted continuous power assurance analysis 310 is described in U.S. Pat. No. 8,068,997, which issued on Nov. 29, 2011, and is entitled, "Continuous Performance Analysis System and Method," and in pending U.S. patent application Ser. No. 13/772,014, entitled "System and Method for Continuous Performance Analysis of Systems that Exhibit Variable Performance Characteristics at Different Operating Conditions." The patent and patent application, which are both assigned to the Assignee of the present application, are hereby incorporated by reference.

The system and method described herein reduces the impact of bleed air flow uncertainty on continuous power assurance accuracy when the exact amount of bleed air flow is uncertain.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of providing bleed air compensation for a continuous power assurance analysis of a gas turbine engine, the method comprising the steps of:

in a processor:
estimating bleed air flow rate from the gas turbine engine by estimating one or more of passive bleed air flow rate, anti-ice bleed air flow rate, and active bleed air flow rate;
estimating a shift in power turbine inlet temperature based on the estimated bleed air flow rate by (i) estimating a first shift in power turbine inlet temperature based on the estimated passive bleed air flow rate, (ii) estimating a second shift in power turbine inlet temperature based on the estimated anti-ice bleed air flow rate, (iii) estimating a third shift in power turbine inlet temperature based on the estimated active bleed air flow rate, and (iv) selectively adding one or both of the second and third shifts in power turbine inlet temperature to the first shift in power turbine inlet temperature; and
applying the estimated shift in power turbine inlet temperature to the continuous power assurance analysis of the gas turbine engine,
wherein:
passive bleed air flow rate is bleed air flow rate to continuously supplied bleed air loads;
anti-ice bleed air flow rate is bleed air flow rate to aircraft anti-ice bleed air loads;
active bleed air flow rate is bleed air flow rate to bleed air loads that are (i) not continuously supplied with bleed air and (ii) not anti-ice bleed air loads.

2. The method of claim 1, further comprising:
collecting transient engine performance data for the gas turbine engine using a plurality of sensors, the transient engine performance data including at least a first engine parameter and a second engine parameter, the first engine parameter being a parameter that varies upon initiation of active bleed air flow; and
supplying the transient engine performance data to the processor and, in the processor:
applying transfer functions to the transient engine performance data to thereby generate a current phase compensated engine performance parameter, the current phase compensated engine performance parameter representative of a current estimate of a steady state value of the first engine parameter as a function of the second engine parameter; and
computing a difference between the current estimate of the steady state value and a previous estimate of the steady state value to thereby generate a residual value.

3. The method of claim 2, further comprising:
estimating the active bleed air flow rate from the gas turbine engine based at least in part on the residual value.

4. The method of claim 2, further comprising:
detecting, in the processor, when active bleed air flow is initiated; and
upon detecting that active bleed air flow is initiated, adding the third shift in power turbine inlet temperature to the first shift in power turbine inlet temperature.

5. The method of claim 4, wherein the step of detecting when active bleed air flow is initiated comprises:
sensing compressor discharge pressure;
sensing fuel flow rate to the gas turbine engine;
processing, in the processor, compressor discharge pressure rate-of-change magnitude and fuel flow rate rate-of-change magnitude; and
detecting that active bleed air flow is initiated when the compressor discharge pressure rate-of-change magnitude exceeds the fuel flow rate rate-of-change magnitude by a predetermined value.

6. The method of claim 1, further comprising:
detecting, in the processor, when anti-ice bleed air flow is initiated; and
upon detecting that anti-ice bleed air flow is initiated, adding the second shift in power turbine inlet temperature to the first shift in power turbine inlet temperature.

7. The method of claim 6, wherein the step of detecting when anti-ice bleed air flow is initiated comprises detecting a position of an anti-ice switch.

8. The method of claim 1, wherein the step of estimating bleed air flow rate comprises:
sensing aircraft flight conditions; and
estimating, in the processor, the bleed air flow rate based at least in part on the sensed aircraft flight conditions.

9. A bleed air compensated continuous power assurance analysis system for an aircraft gas turbine engine, comprising:
a flight conditions data source configured to supply flight conditions data, the flight conditions data representative of aircraft flight conditions; and
a processor coupled to receive the flight conditions data and configured, upon receipt thereof, to:
estimate bleed air flow rate from the gas turbine engine by estimating one or more of passive bleed air flow rate, anti-ice bleed air flow rate, and active bleed air flow rate;
estimate a shift in power turbine inlet temperature based on the estimated bleed air flow rate by (i) estimating a first shift in power turbine inlet temperature based on the estimated passive bleed air flow rate, (ii) estimating a second shift in power turbine inlet temperature based on the estimated anti-ice bleed air flow rate, (iii) estimating a third shift in power turbine inlet temperature based on the estimated active bleed air flow rate, and (iv) selectively adding one or both of the second and third shifts in power turbine inlet temperature to the first shift in power turbine inlet temperature; and
apply the estimated shift in power turbine inlet temperature to the continuous power assurance analysis of the gas turbine engine,
wherein:
passive bleed air flow rate is bleed air flow rate to continuously supplied bleed air loads;
anti-ice bleed air flow rate is bleed air flow rate to aircraft anti-ice bleed air loads; and
active bleed air flow rate is bleed air flow rate to bleed air loads that are (i) not continuously supplied with bleed air and (ii) not anti-ice bleed air loads.

10. The system of claim 9, further comprising:
a first sensor operable to sense a first engine parameter and supply first transient performance data representative of the first engine parameter;
a second sensor operable to sense a second engine parameter and supply second transient performance data representative of the second engine parameter;
a processor coupled to receive the first and second transient performance data from the first and second sensors, respectively, the processor operable, upon receipt thereof, to:
apply transfer functions to the transient performance data to thereby generate a current phase compensated engine performance parameter, the current phase compensated engine performance parameter representative of a current estimate of a steady state value of the first engine parameter as a function of the second engine parameter; and
compute a difference between the current estimate of the steady state value and a previous estimate of the steady state value to thereby generate a residual value.

11. The system of claim 10, wherein the processor is further configured to estimate the active bleed air flow rate from the gas turbine engine based at least in part on the residual value.

12. The system of claim 10, wherein the processor is further configured to:
detect when active bleed air flow is initiated; and
upon detecting that active bleed air flow is initiated, add the third shift in power turbine inlet temperature to the first shift in power turbine inlet temperature.

13. The system of claim 12, further comprising:
a compressor discharge pressure sensor configured to sense compressor discharge pressure and supply a compressor discharge signal representative thereof; and
a fuel flow rate sensor configured sense fuel flow rate to the gas turbine engine and supply a fuel flow rate signal representative thereof,
wherein the processor is coupled to receive the compressor discharge signal and the fuel flow rate signal, and is configured, upon receipt of these signals, to:
determine compressor discharge pressure rate-of-change magnitude and fuel flow rate rate-of-change magnitude; and
detect that active bleed air flow is initiated when the compressor discharge pressure rate-of-change magnitude exceeds the fuel flow rate rate-of-change magnitude by a predetermined value.

14. The system of claim 9, wherein the processor is coupled to receive an anti-ice initiation signal and is configured, upon receipt thereof, to:
detect that anti-ice bleed air flow is initiated; and
add the second shift in power turbine inlet temperature to the first shift in power turbine inlet temperature.

15. The system of claim 14, further comprising:
an anti-ice switch configured to selectively supply the anti-ice initiation signal to the processor.

* * * * *